Patented June 28, 1932

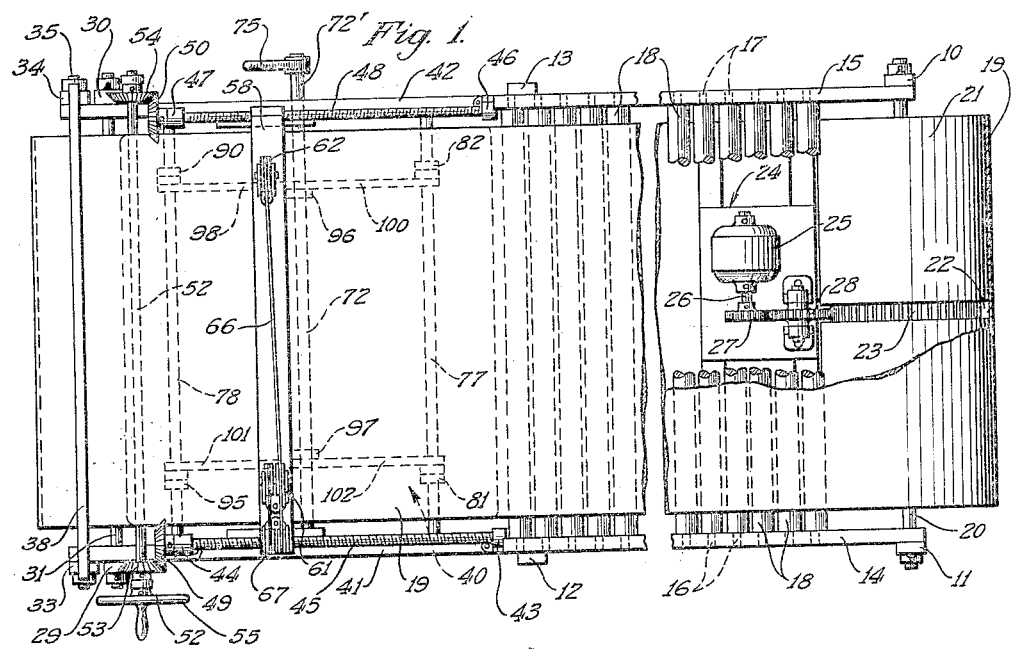
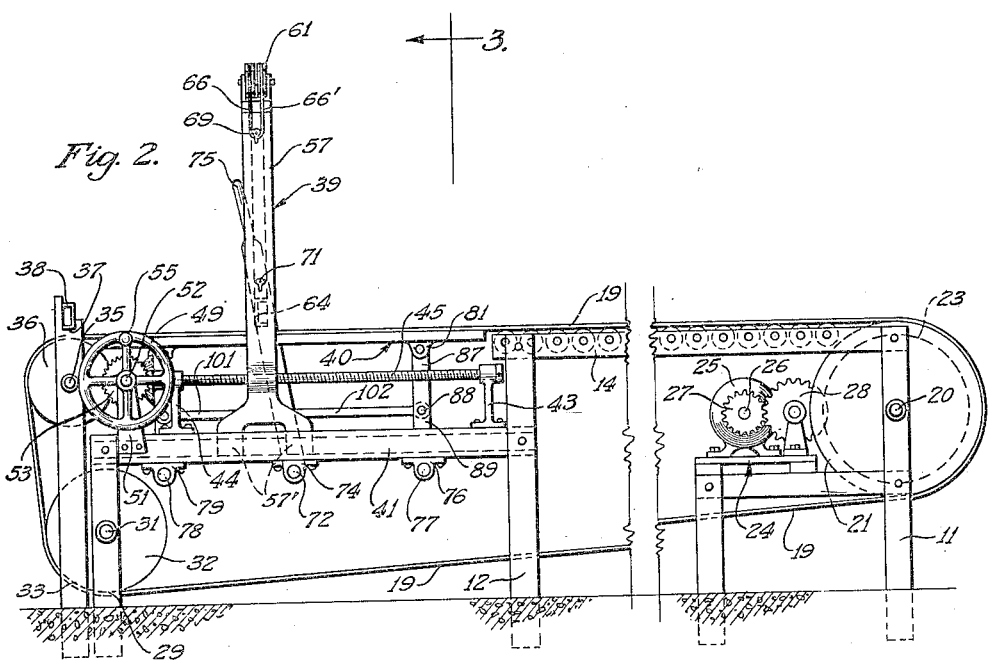

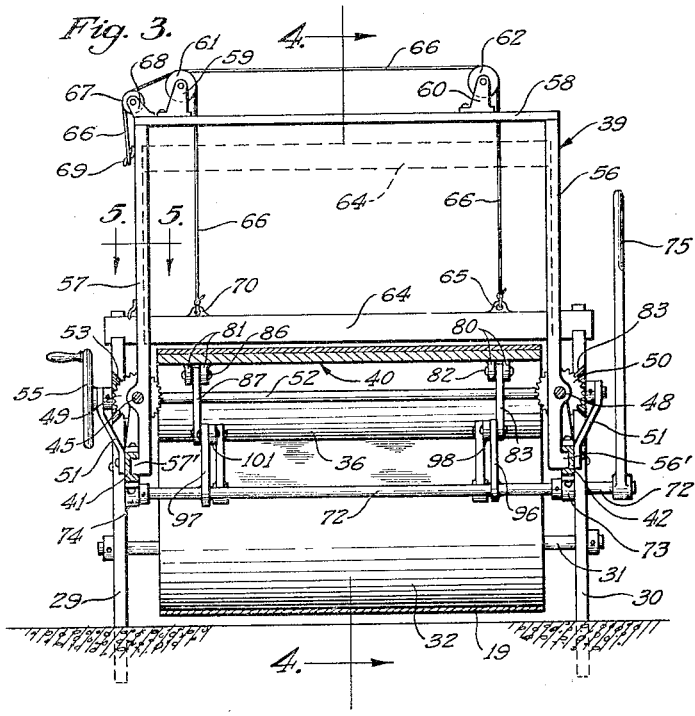
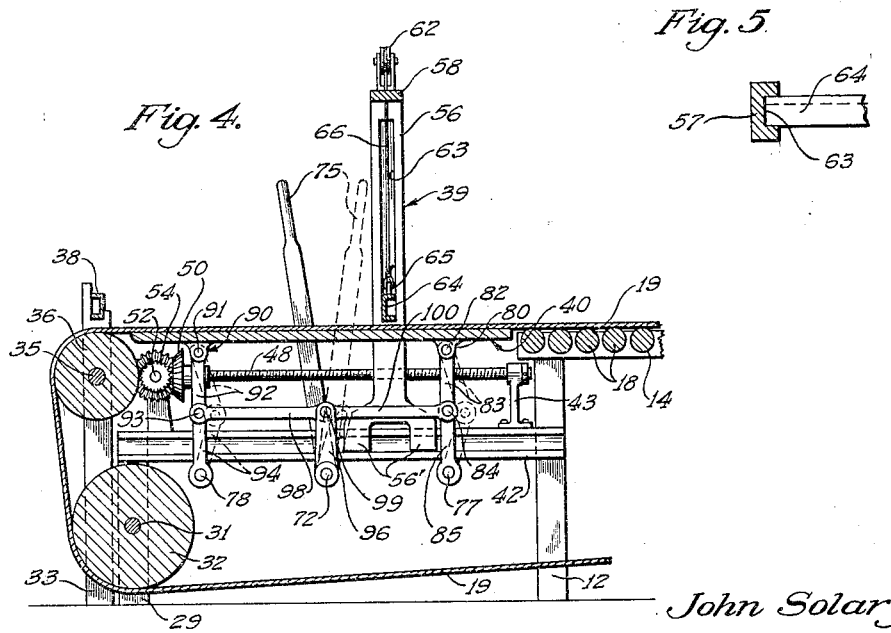

1,865,287

UNITED STATES PATENT OFFICE

JOHN SOLARY, OF CHICAGO, ILLINOIS

MACHINE FOR MAKING ARTIFICIAL STONES

Application filed December 12, 1930. Serial No. 501,991.

This invention relates to certain novel improvements in machines for making artificial stones, and has for its principal object the provision of an improved construction of this character which will be highly efficient in use and economical in manufacture.

Among the several objects of this invention is to provide an improved machine for making artificial stone and which is arranged in such a manner that molds of various sizes and shapes may be employed therewith.

Another object of the invention is to provide an improved machine of the character described herein in which the mold, during the casting operation, may be securely held between a stationary and a movable upright.

Another object of the invention is to arrange the machine such that during the casting operation the mold will rest on an endless belt conveyer, the mold being clamped against lateral movement by means of a stationary member and a movable upright.

A further object of the invention is to arrange the machine in such a manner that during the casting operation the mold will rest on and be held against lateral movement on an endless belt conveyer, means being provided for supporting the conveyer belt during the casting operation, and said means are so arranged that when the molding operation is completed the mold may be stripped from the stone and said means for supporting the weight of the mold and stone may be dropped down out of engagement with the belt so that the belt may be operated by power driven means to convey the stones away from the casting portion of the belt.

An additional object of the invention is to arrange the machine so that after the molding operation the stone may be moved on the conveyer past the movable upright which prevents lateral movement of the mold during the molding operation.

A still further object of the invention is to provide a machine having a minimum number of controls and so that all of said controls may be operated by one workman.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a top plan view of a preferred form of construction of the invention;

Fig. 2 is a side elevational view of the invention as depicted in Fig. 1;

Fig. 3 is a sectional detail view taken substantially on the line 3—3 in Fig. 2;

Fig. 4 is a sectional detail view taken substantially on the line 44 in Fig. 3; and Fig. 5 is a sectional detail view of a part of the movable upright clamping member embodied in the invention:

Referring to the drawings wherein a preferred form of construction of the invention is depicted, indicated at 10 and 11 are legs which cooperate with legs 12 and 13 to support horizontal bars 14 and 15. Having reduced end portions 16 and 17 which are rotatably journaled in the bars 14 and 15 are rollers 18 above which travels an endless belt conveyer 19. Having one end rotatably journaled in the leg 11 and bar 14 and having the other end journaled in the bar 15 and leg 10 is a shaft 20 which carries a drum 21. An annular groove 22 (Fig. 1) is provided in the drum 21, in the midportion thereof, and a ring gear 23 is provided in this groove 22. A suitable platform is generically indicated at 24 and mounted on this platform 24 is an electric motor 25 which includes a shaft 26. Carried by the shaft 26 is a gear 27 which meshes with a speed reducing gear 28 and this gear 28 meshes with the ring gear 23. Suitable control means are intended to be provided for the motor 25 and by operation of the motor 25, the gear 27 will transmit motion to gear 28 and ring gear 23 to drive the drum 21 and the belt 19.

At the end of the machine opposite the drum 21 legs 29 and 30 are provided and having its end portions rotatably journaled in these legs so as to extend therebetween is a shaft 31 which carries a drum 32. Adjacent the leg 29 a leg 33 is provided and adjacent the leg 30 a leg 34 is provided. Having its end portions rotatably journaled in the legs 33 and 34 so as to extend therebetween is a shaft 35 which carries a drum 36. Manifestly, therefore, as the belt 19 is driven, in the manner hereinbefore described, it will pass around the drum 23, drum 32, drum 36 and over the rollers 18.

The legs 33 and 34 are recessed, as at 37, and having its end portions disposed in these recesses 37 so as to extend between the legs 33 and 34 is a channel-shaped bar 38. In the use of the invention, the mold is placed upon the belt 19 so that one side thereof abuts the bar 38. I provide a movable upright structure, generically indicated at 39, which cooperates with the bar 38 to hold the mold in fixed position during the casting operation and to position the body formed in the mold in proper position on the belt for passage between the uprights 56 and 57 in a manner to be described hereinafter. A vertically movable table, generically indicated at 40, is provided and this table in raised position abuts the under side of the belt 19 so as to support the mold and a stone therein during the molding operation. After the molding operation is completed, the mold is stripped from the stone and the table 40 is lowered in a manner to be described hereinafter, and the belt 19 is then set in operation so as to move the molded stone away from the portion of the belt on which it is cast or to the curing room or other desired place.

Extended between the legs 12 and 29 is a rail 41 and extended between the legs 13 and 30, parallel to the rail 41, is a rail 42. Supported on the rail 41 are bearing brackets 43 and 44 between which is extended a screw 45. Similar bearing brackets 46 and 47 are provided on the rail 42 and extended between these brackets 46 and 47 is a screw 48 threaded oppositely to the screw 45. Mounted on one end of the screw 45 is a gear 49 and a similar gear 50 is carried by the screw 48. Brackets 51 are mounted on the rails 41 and 42 and journaled in the upper ends of these brackets is a shaft 52. A gear 53 is carried by the shaft 52 and this gear meshes with the gear 49. A similar gear 54 is provided at the opposite end of the shaft 52 and this gear 54 meshes with the gear 50. A hand wheel 55 is provided on the shaft 52.

Threadedly mounted on the screw 50 and having foot portions 56 slidably mounted in the rail 42 is an upright standard 56. A similar standard 57 is threadedly mounted on the screw 45 and this standard 57 includes foot portions 57' which are slidably mounted in the rail 41, as best shown in Fig. 3. A rail 58 is mounted on the upper ends of the standards 56 and 57 and extends therebetween. Mounted on the rail 58 is a bracket 59 which supports a double pulley 61. Another bracket 60 is mounted on the rail 58 and this bracket supports a single pulley 62. The standard 56 has a vertically extending recess 63 provided therein and the standard 57 is similarly recessed. Slidable vertically through the recess 63 and a similar recess in the standard 57, is a bar 64. Having one end attached to the bar 64, as at 65, is a cable 66 which extends over the pulley 62 and over one sheave of the double pulley 61. The cable 66 then extends over one sheave of a double pulley 67, which is mounted on a bracket 68 on the rail 58, and around a hook 69 on the standard 57. The cable 66 then extends over the other sheave of the double pulley 67, over the other sheave of the pulley 61, and is attached to the bar 64 as at 70. A hook 71 is mounted on the standard 57 at a predetermined distance below the latch 69, and it is apparent that by grasping the looped portion 66' of the cable 66 that is normally disposed about the hook 69, as in Fig. 2, the looped portion 66' may be drawn downwardly so as to engage the hook 71 which will raise the bar 64 into the dotted line position of Fig. 3. Thus when the molding operation is completed, and the mold stripped from the stone, and it is desired to remove the stone from between the bars 38 and 64, the bar 64 may be raised in the manner described above so that by operating the motor 25 the belt 19 may be moved in a clockwise direction, as seen in Fig. 2, so as to move the stone therealong to the right hand end of the machine as shown in Fig. 2, from which end of the machine the mold may be moved into the curing room or otherwise handled, as by allowing a number of stones to accumulate on the belt and curing them thereon.

It being apparent that when the mold is disposed on the belt 19 between the bars 38 and 64 the weight of the mold and the stone cast therein will be supported by the table 40 which will then be disposed as in Fig. 2, the upper surface of the table 40 engaging the lower surface of the belt 19. The present invention contemplates providing means for lowering and raising the table 40, since it is necessary in order to move the belt 19, when a stone is disposed thereon, that the table 40 be lowered from engagement with the belt 19. The means for raising and lowering the table 40 will now be described: In this connection there is provided a shaft 72 which is journaled in suitable bearing brackets 73 and 74 carried by the rails 42 and 41. The shaft 73 includes an end portion 72' (Fig. 3) on which is provided an operating lever 75. Having one end rotatably journaled in a bearing bracket 76 (Fig. 2) supported by the rail 41, and having its opposite end similarly mounted in a bracket supported by the rail 42, is a rod 77. A similar rod 78 has one end journaled in a bracket 79 supported by the rail 41 and this rod 78 has its other end journaled in a suitable bracket on the rail 42.

Depending from the lower side of the table 40, in vertical alignment with the rod 77, and at each side of the table 40, are similar pairs of bosses 80 and 81. Extended through the pair of bosses 80 is a pintle 82 on which is mounted a link 83. Pivotally connected to the link 83, as at 84, is a link 85, the lower end of which is pivotally mounted on the rod 77.

A pintle 86 is mounted in the pair of bosses 81 and pivotally mounted on this pintle is a link 87 to which is pivotally connected, as at 88, a link 89, the lower end of the link 89 being pivotally mounted on the rod 77.

Adjacent the end of the table 40 that is disposed near the bar 38, bosses 90 are provided that are similar to the bosses 80. Pivotally mounted between the bosses 90, as at 91, is a link 92, to the lower end of which is pivotally connected, as at 93, a link 94. The lower end of the link 94 is pivotally mounted in the rod 78 (Fig. 4). A similar link structure extends between the rod 78 and the bosses generically indicated at 95 (Fig. 1).

Mounted on the shaft 72, at the ends thereof, are links 96 and 97. Having one end pivotally connected to the lower end of the link 92 and to the upper end of the link 94, is a horizontally extending link 98, the other end of which is pivotally connected to the link 96, as at 99. A similar link 100 pivotally interconnects the link 96 and the links 83 and 85 (Fig. 4). A link 101, similar to the link 98, pivotally interconnects the link 97 with the links that extend from the bosses 95 to the rod 78 (Figs. 1 and 2) and a link 102, similar to the link 100, pivotally interconnects the link 97 with the links 87 and 89 (Figs. 1 and 2).

When the lever 75 is disposed in the solid line position of Fig. 4, the table 40 will be engaged with the belt 19, as shown in full lines in Figs. 2, 3, and 4. By moving the lever 75 into the dotted line position of Fig. 4, however, the shaft 72 will be rocked to transmit motion through the links 96 and 97, through links 98 and 100, and links 101 and 102, to the four hereinbefore described vertically extending link structures that are disposed at the corners of the table 40, which will rock these last named link structures on the rods 77 and 78 and since these vertically extending link structures at the corners of the table are capable of being flexed at the midpoints in their vertical extents, the table 40 will be lowered out of engagement with the belt 19, so that by operating suitable controls for the motor 25 the belt 19 may be moved to move the mold toward the right hand end of the machine, as seen in Figs. 1 and 2. Suitable controls for the motor 25 may be associated with the hand lever 75 so that when the table 40 is lowered from engagement with the belt 19, the motor 25 will be operated to move the belt 19 and the stone thereon.

Since the standards 56 and 57 are threadedly mounted on the screws 48 and 45, it is apparent that by rotating the hand wheel 55 motion may be imparted to the shaft 52, through gears 53 and 54, and gears 49 and 50 to rotate the screws 48 and 45 which will move the standards 56 and 57 therealong, the foot portions 56' and 57' of the standards 56 and 57 sliding on the rails 42 and 41. In this manner the bar 64 may be moved horizontally so as to accommodate molds of various sizes between the bar 64 and the bar 38.

From the foregoing description of the invention it will be seen, therefore, that the present invention provides a machine which will expeditiously and economically handle molds of various sizes so that as the molding operation is completed the stones may be quickly and in a minimum of time moved from the casting portion of the belt and transported to the curing room or other desired place or allowed to remain on the belt.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a machine of the class described, an endless conveyor, supporting means for said conveyor, operating means for said conveyor means for retaining a mold on said conveyor during the molding operation including a stationary member and a movable member, means for moving said movable member in a horizontal plane over said belt, means for moving said movable member in a vertical plane above said belt, and means for maintaining said mold-supporting portion of said conveyor taut during the molding operation including vertically movable means movable into and out of engagement with the lower side of said conveyor, and means for operating said vertically movable means.

2. In a machine of the class described, an endless conveyor adapted to support a mold on a portion thereof during the molding operation, supporting means for said conveyor, operating means for said conveyor, and means for maintaining said mold supporting portion of said conveyor in taut position during the molding operation, said last mentioned means including vertically movable means adapted to engage the lower side of of mold-supporting portion of said conveyor, and means for moving said vertically movable means into and out of engagement with said conveyor portion.

3. In a machine of the class described, an endless belt adapted to support a mold on one portion thereof during the molding operation, supporting means for said belt, operating means for said belt, means for maintaining said mold supporting portion of said belt in taut position during the molding operation, said last named means including a table adapted to have the upper surface thereof abut the lower surface of said portion of said belt during the molding operation, and means for vertically moving said table into and out of engagement with said portion of said belt.

4. In a machine of the class described, an endless belt, supporting means for said belt, operating means for said belt including motive power means, means for retaining a mold of variable size on a portion of said belt during the molding operation, means for maintaining said portion of said belt taut during the molding operation including a table engaging the lower side of said belt portion, means for moving said retaining means out of engagement with said mold, and means for moving said table out of engagement with said belt portion to permit said motive power means to move said belt whereby to transport a stone formed by said mold therealong.

5. In a machine of the class described, an endless belt, supporting means for said belt, operating means for said belt including motive power means, means for retaining a mold of variable size on a portion of said belt during the molding operation, including a stationary member and a movable bar member extending transversely of said belt, means for maintaining said portion of said belt taut during the molding operation including a table engaging the lower side of said belt portion, means for moving said movable bar member out of engagement with said mold, and means for moving said table out of engagement with said belt portion to permit said motive power means to move said belt whereby to transport a stone formed by said mold therealong.

6. In a machine of the class described, an endless belt, supporting means for said belt, operating means for said belt including motive power means, means for retaining a mold of variable size on a portion of said belt during the molding operation including a stationary member and a movable bar member extending transversely of said belt, means for maintaining said portion of said belt taut during the molding operation including a table engaging the lower side of said belt portion, means for moving said movable bar member out of engagement with said mold, and in a direction parallel to the longitudinal extent of said belt, means for moving said table out of engagement with said belt portion to permit said motive power means to move said belt whereby to transport a stone formed by said mold therealong, and means for vertically moving said bar member out of the path of movement of said stone on said belt.

7. In a machine of the class described, an endless belt, supporting means for said belt, operating means for said belt including motive power means, means for retaining a mold of variable size on a portion of said belt during the molding operation including a stationary member and a movable bar member extending transversely of said belt, means for maintaining said portion of said belt taut during the molding operation including a table engaging the lower side of said belt portion, means for moving said movable bar out of engagement with said mold, said last named means including means for moving said bar member in a horizontal plane above said belt and including a pair of upright supporting members, means supported by said upright members for moving said bar member in a vertical plane above said belt, and means for moving said table out of engagement with said belt portion to permit said motive power means to move said belt whereby to transport a stone formed by said mold therealong.

8. In a machine of the class described, an endless belt adapted to support a mold on one portion thereof during the molding operation, supporting means for said belt, operating means for said belt, means for maintaining said mold supporting portion of said belt in taut position during the molding operation, said last named means including a table adapted to have the upper surface thereof abut the lower surface of said portion of said belt during the molding operation, means for vertically moving said table into and out of engagement with said portion of said belt, including rocker shafts, a link structure pivotally interconnecting said shafts and said table, and an operating lever on one of said shafts for transmitting movement therefrom through said shafts and said link structure to said table.

In testimony whereof I affix my signature.

JOHN SOLARY.